(12) United States Patent
Jiang et al.

(10) Patent No.: US 10,863,578 B2
(45) Date of Patent: Dec. 8, 2020

(54) DATA TRANSMISSION METHOD, DEVICE AND SYSTEM

(71) Applicant: Beijing Xiaomi Mobile Software Co., Ltd., Beijing (CN)

(72) Inventors: Xiaowei Jiang, Beijing (CN); Wei Hong, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/351,868

(22) Filed: Mar. 13, 2019

(65) Prior Publication Data

US 2019/0215901 A1 Jul. 11, 2019

Related U.S. Application Data

(63) Continuation of application No. PCT/CN2016/099495, filed on Sep. 20, 2016.

(51) Int. Cl.
*H04W 76/10* (2018.01)
*H04W 80/02* (2009.01)
*H04W 80/08* (2009.01)
*H04L 5/00* (2006.01)
*H04W 76/11* (2018.01)
*H04W 28/06* (2009.01)

(52) U.S. Cl.
CPC .......... *H04W 80/02* (2013.01); *H04L 5/0005* (2013.01); *H04W 28/065* (2013.01); *H04W 76/11* (2018.02); *H04W 80/08* (2013.01)

(58) Field of Classification Search
CPC ... H04W 80/02; H04W 28/065; H04W 76/11; H04W 80/08; H04W 28/06; H04L 5/0005
See application file for complete search history.

(56) References Cited

U.S. PATENT DOCUMENTS

2009/0046631 A1* 2/2009 Meylan ................. H04W 80/02
370/328
2018/0255499 A1* 9/2018 Loehr .................... H04W 40/22

FOREIGN PATENT DOCUMENTS

| CN | 101039170 A | * | 3/2006 | .......... H04L 1/0078 |
| CN | 101039170 A | | 9/2007 | |
| CN | 101222416 A | | 7/2008 | |
| CN | 101682464 A | | 3/2010 | |

OTHER PUBLICATIONS

3GPP TS 36.321v13, Jun. 2016, Medium Access Control (MAC) protocol specification.*

(Continued)

*Primary Examiner* — Lakeram Jangbahadur
(74) *Attorney, Agent, or Firm* — Finnegan, Henderson, Farabow, Garrett & Dunner, L.L.P.

(57) ABSTRACT

A data transmission method includes: acquiring n RLC PDUs transmitted from an RLC layer, n being an integer greater than 1; encapsulating the indication information corresponding to the n RLC PDUs as a packet header of a MAC PDU and the n RLC PDUs as a packet body of the MAC PDU, to generate the MAC PDU, the indication information corresponding to the n RLC PDUs comprising an LCID, a sequence number, and a length corresponding to each RLC PDU; and sending the MAC PDU to a communication peer.

16 Claims, 9 Drawing Sheets

(56) References Cited

OTHER PUBLICATIONS

English version of International Search Report of PCT Application No. PCT/CN2016/099495, dated Jun. 27, 2017, issued by the ISA/CN—State Intellectual Property Office of the P.R. China.
*3rd Generation Partnership Project; Technical Specification Group Radio Access Network; Evolved Universal Terrestrial Radio Access (E-UTRA); Medium Access Control (MAC) protocol specification,* "Technical Specification—3GPP TS 36.321 V13.2.0" (Jun. 2016), 91 pgs.

* cited by examiner

DATA TRANSMISSION METHOD, DEVICE AND SYSTEM

CROSS-REFERENCE TO RELATED APPLICATIONS

This application is a continuation of International Application No. PCT/CN2016/099495, filed on Sep. 20, 2016, which is incorporated herein by reference in its entirety.

TECHNICAL FIELD

The present disclosure relates to the field of wireless communication technology, and in particular, to a data transmission method, a data transmission device and a data transmission system.

BACKGROUND

With development of wireless communication technology, relevant organizations are conducting research and standardization of next-generation mobile communication technology standards. The research on functions of a radio interface protocol layer involves functions of a Radio Link Control (RLC) layer and a Media Access Control (MAC) layer.

In a Long Term Evolution (LTE) system, both the RLC layer and the MAC layer have a function of concatenation of Protocol Data Units (PDUs). Taking the RLC layer as an example, after receiving multiple Packet Data Convergence Protocol (PDCP) PDUs transmitted from a PDCP layer, the RLC layer can concatenate the multiple PDCP PDUs into one RLC PDU, and then transmit the RLC PDU to the MAC layer. Taking the MAC layer as an example, after receiving multiple RLC PDUs transmitted from the RLC layer, the MAC layer can concatenate the multiple RLC PDUs into one MAC PDU, and then transmit the MAC PDU to a lower layer.

At present, relevant organizations are discussing the integration of the concatenation function of the RLC layer and the concatenation function of the MAC layer. That is, the data is not concatenated at the RLC layer, but at the MAC layer, which has certain advantages. For example, the RLC layer may not have to wait for the relevant indication information sent from the MAC layer, to construct the RLC PDU, which can help to save time for the RLC layer to construct and transmit the RLC PDU.

SUMMARY

Embodiments of the present disclosure provide a data transmission method, a data transmission device and a data transmission system. The technical solutions are as follows.

According to a first aspect of the embodiments of the present disclosure, there is provided a data transmission method. The method includes: acquiring n RLC PDUs transmitted from an RLC layer, where the n is an integer greater than 1; using indication information corresponding to the n RLC PDUs as a header of a MAC PDU, and using the n RLC PDUs as a body of the MAC PDU, and encapsulating the header and the body to generate the MAC PDU, wherein the indication information corresponding to the n RLC PDUs includes an LCID, a sequence number, and a length corresponding to each of the RLC PDUs; and sending the MAC PDU to a communication peer.

According to a second aspect of the embodiments of the present disclosure, there is provided a data transmission method. The method includes: receiving a MAC PDU sent from a communication peer, wherein a body of the MAC PDU includes n RLC PDUs, a header of the MAC PDU includes indication information corresponding to the n RLC PDUs, and the indication information corresponding to the n RLC PDUs includes an LCID, a sequence number, and a length corresponding to each of the RLC PDUs, where the n is an integer greater than 1; parsing the header of the MAC PDU to generate a second sequence number list, wherein the second sequence number list includes sequence numbers corresponding to the n RLC PDUs; and transmitting the n RLC PDUs and the second sequence number list to an RLC layer, wherein a transmission order of the n RLC PDUs and an order of the sequence numbers corresponding to the n RLC PDUs in the second sequence number list are consistent.

According to a third aspect of the embodiments of the present disclosure, there is provided a data transmission device. The device includes: a processor; and a memory for storing instructions executable by the processor, wherein the processor is configured to: acquire n RLC PDUs transmitted from an RLC layer, where the n is an integer greater than 1; use indication information corresponding to the n RLC PDUs as a header of a MAC PDU, and use the n RLC PDUs as a body of the MAC PDU, and encapsulate them to generate the MAC PDU, wherein the indication information corresponding to the n RLC PDUs includes an LCID, a sequence number, and a length corresponding to each of the RLC PDUs; and send the MAC PDU to a communication peer.

According to a fourth aspect of the embodiments of the present disclosure, there is provided a data transmission device. The device includes: a processor; and a memory for storing instructions executable by the processor, wherein the processor is configured to: receive a MAC PDU sent from a communication peer, wherein a body of the MAC PDU includes n RLC PDUs, a header of the MAC PDU includes indication information corresponding to the n RLC PDUs, and the indication information corresponding to the n RLC PDUs includes an LCID, a sequence number, and a length corresponding to each of the RLC PDUs, where the n is an integer greater than 1; parse the header of the MAC PDU to generate a second sequence number list, wherein the second sequence number list includes sequence numbers corresponding to the n RLC PDUs; and transmit the n RLC PDUs and the second sequence number list to an RLC layer, wherein a transmission order of the n RLC PDUs and an order of the sequence numbers corresponding to the n RLC PDUs in the second sequence number list are consistent.

The technical solutions provided by the embodiments of the present disclosure may include the following beneficial effects:

The sequence number corresponding to each RLC PDU is encapsulated in the header of the MAC PDU when the MAC PDU is formed by the MAC layer concatenating the RLC PDUs. It can solve the problem in the related that the delay due to processing the MAC PDU by the communication peer is high, and it can improve the efficiency of parsing and obtaining the sequence number corresponding to each RLC PDU after the communication peer receives the MAC PDU.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
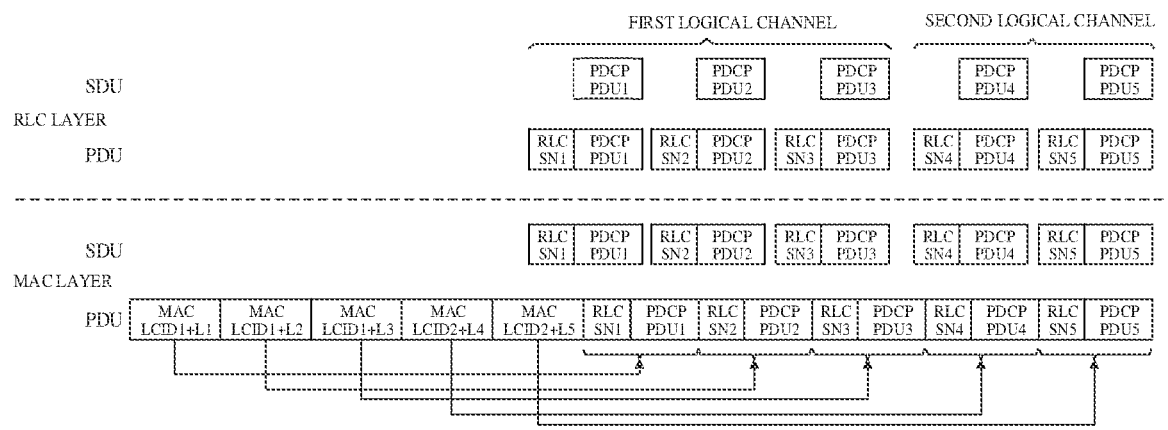
FIG. 1 is a schematic diagram of constructing a MAC PDU according to prior art.

In the related art, a solution for implementing a concatenation function at the MAC layer is provided. As shown in FIG. 1, after receiving the PDCP PDU transmitted from the PDCP layer, the RLC layer generates an RLC PDU. The header of each RLC PDU includes a sequence number (SN) corresponding to the RLC PDU, but does not include the length corresponding to the RLC PDU. The RLC layer transmits the RLC PDU to the MAC layer. The MAC layer concatenates multiple RLC PDUs into one MAC PDU. The header of the MAC PDU includes a logical channel identifier (LCID) and the length (indicated by L) corresponding to each RLC PDU. The body of the MAC PDU includes each RLC PDU, and the header of each RLC PDU includes a SN corresponding to the RLC PDU.

It should be noted that the data that is not processed in each protocol layer is called a service data unit (SDU), and the data formed in a specific format after being processed by the protocol layer is called a PDU. The PDU formed in an upper layer and sent to a lower layer is a lower-layer SDU. For example, the PDCP PDU sent from the PDCP layer to the RLC layer is the SDU of the RLC layer. The RLC layer processes the SDU to obtain an RLC PDU. The RLC layer sends the RLC PDU to the MAC layer, and accordingly, the RLC PDU is the SDU of the MAC layer. The MAC layer processes the SDU to obtain a MAC PDU, and the MAC layer sends the MAC PDU to the lower layer. In addition, the sequence number corresponding to the RLC PDU is allocated by the RLC layer, and the sequence numbers corresponding to different RLC PDUs are also different.

Since the SN corresponding to the RLC PDU is in the body of the MAC PDU, the SN and the data are mixed together, so that after receiving the MAC PDU, the communication peer has to parse the entire MAC PDU to extract the SN corresponding to each RLC PDU. The delay due to processing the MAC PDU by the communication peer is high. In view of the above, embodiments of the present disclosure provide a data transmission method, and a data transmission device and a data transmission system based on the method, to solve the above problem. For example, the technical solutions provided by the embodiments of the present disclosure encapsulate the SN corresponding to each RLC PDU in the header of the MAC PDU to avoid mixture of the SN and the data.

The network architecture and the service scenario described in the embodiments of the present disclosure are provided in order to more clearly illustrate the technical solutions of the embodiments of the present disclosure, and do not constitute a limitation of the technical solutions provided by the embodiments of the present disclosure. It would be appreciated by those skilled in the art that, with the evolution of the network architecture and the emergence of new service scenario, the technical solutions provided by the embodiments of the present disclosure are equally applicable to similar technical problems.

Figure 2:
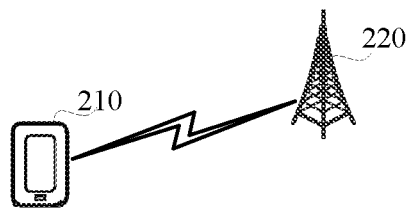
FIG. 2 is a schematic diagram of an application scenario according to an exemplary embodiment.

FIG. 2 is a schematic diagram of an application scenario according to an exemplary embodiment. The application scenario includes: a first device 210 and a second device 220.

The first device 210 is a data transmission device, and the second device 220 is a data receiving device. A communication connection is established between the first device 210 and the second device 220 through a wireless interface (i.e., an air interface). In one example, the first device 210 is a terminal and the second device 220 is a base station. In another example, the first device 210 is a base station and the second device 22.0 is a terminal. In FIG. 2, as an example, the first device :210 is a terminal, and the second device 220 is a base station.

Under normal circumstances, the number of terminals is usually multiple, and the multiple terminals are located within a cell managed by the base station. The base station and the terminal communicate with each other by an air interface technology, for example, by cellular technology. The technical solutions described in the embodiments of the present disclosure may be applicable to an LTE system, and may also be applicable to a subsequent evolved system of the LTE system, such as an LTE-A (LTE-Advanced) system, a fifth-generation (5th generation, 5G) system, and the like.

In practical applications, the terminal and the base station usually have both the function of the first device and the function of the second device. That is, each of the terminal and the base station can be used as the first device to generate the data packet through encapsulation, and to send the data packet to the communication peer. Each of the terminal and the base station can also be used as the second device, receive a data packet from the communication peer, and parse and process the data packet.

In the embodiments of the present disclosure, the terms "network" and "system" are often used interchangeably, but those skilled in the art can understand the meaning thereof.

The terminal involved in the embodiments of the present disclosure may include various devices having wireless communication functions, such as handheld devices, vehicle n-board devices, wearable devices, computing devices, or other processing devices connected to a wireless modem, and various forms of user equipment (UE), mobile stations (MS), terminal devices, and the like. For convenience of description, the devices mentioned above are collectively referred to as terminals. A base station (BS) involved in an embodiment of the present disclosure is a device deployed in a radio access network to provide a wireless communication function for a terminal. The base station may include various forms of macro base stations, micro base stations, relay stations, access points, and the like. In systems employing different radio access technologies, the names of devices with base station functions may vary, such as in an LTE system, referred to as an evolved Node B (eNB or eNodeB). For convenience of description, in the embodiments of the present disclosure, the foregoing device for providing a wireless communication function to a terminal is collectively referred to as a base station or a BS.

Figure 3A:
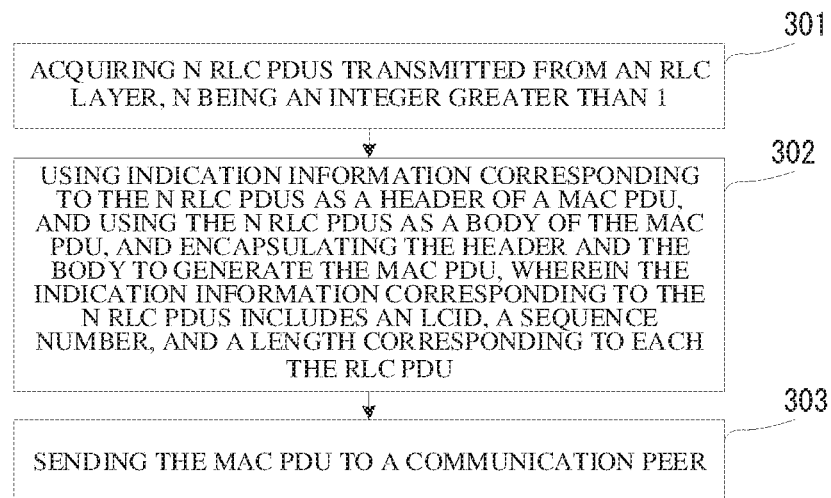
FIG. 3A is a flowchart of a data transmission method according to an exemplary embodiment.

FIG. 3A is a flowchart of a data transmission method according to an exemplary embodiment. In this embodiment, the method is applied to the first device as an example. For example, the first device may be a terminal or a base station. The method may include the following steps.

In step 301, n RLC PDUs transmitted from an RLC layer are acquired, n being an integer greater than 1.

The MAC layer acquires n RLC PDUs transmitted from the RLC layer. After receiving the PDCP PDU transmitted from a PDCP layer, the RLC layer generates an RLC PDU. In the embodiment of the present disclosure, the sequence number (SN) corresponding to the RLC PDU is not included in the header of the RLC PDU. The header of the RLC PDU may include other parameters such as an indication bit, a control bit, and the like.

Figure 3B:
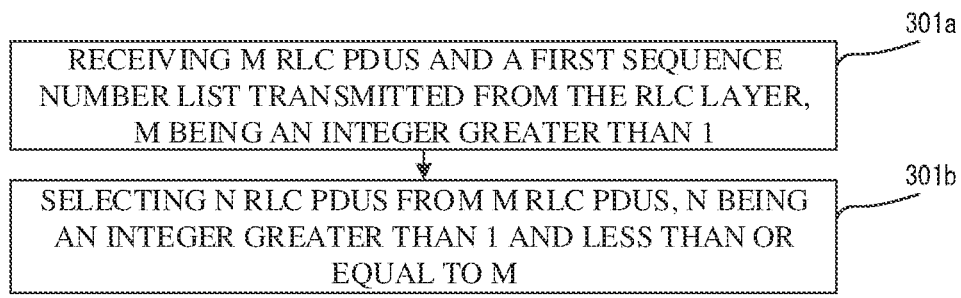
FIG. 3B is a flowchart of a data transmission method according to an exemplary embodiment.

In one example, as shown in FIG. 3B, step 301 includes the following sub-steps.

In step 301a, in RLC PDUs and a first sequence number list transmitted from the RLC layer are received, m being an integer greater than 1.

The MAC layer receives the m RLC PDUs and the first sequence number list transmitted from the RLC layer. The first sequence number list includes the sequence numbers corresponding to the in RLC PDUs, and the order of the sequence numbers corresponding to the in RLC PDUs is consistent or matches with the transmission order of the m RLC PDUs. For example, the RLC layer sequentially transmits 10 RLC PDUs to the MAC layer, and the first sequence number list includes the sequence numbers corresponding to the 10 RLC PDUs, and the order of the 10 sequence numbers is consistent with the transmission order of the 10 RLC PDUs. That is, the first sequence number in the first sequence number list is the sequence number corresponding to the first RLC PDU transmitted from the RLC layer to the MAC layer, the second sequence number in the first sequence number list is the sequence number corresponding to the second RLC PDU transmitted from the RLC layer to the MAC layer, and so on so forth. The tenth sequence number in the first sequence number list is the sequence number corresponding to the tenth RLC PDU transmitted from the RLC layer to the MAC layer.

In addition, in the embodiment of the present disclosure, the timing of sending the first sequence number list to the MAC layer from the RLC layer is not limited. The RLC layer may send the first sequence number list in the process of transmitting the RLC PDUs to the MAC layer, may send the first sequence number list before transmitting the RLC PDUs to the MAC layer, or may send the first sequence number list after transmitting the RLC PDUs to the MAC layer.

In addition, the RLC layer may transmit the RLC PDUs to the MAC layer through one or more logical channels. Under normal circumstances, different kinds of data may be transmitted through different logical channels. For example, data of a first service is transmitted through a first logical channel, and data of a second service is transmitted through a second logical channel.

In step 301b, n RLC PDUs are selected from m RLC PDUs, where n is an integer greater than 1 and less than or equal to m.

The MAC layer selects n RLC PDUs from m RLC PDUs, and the selected n RLC PDUs are used to be concatenated to form one MAC PDU.

Figure 3C:
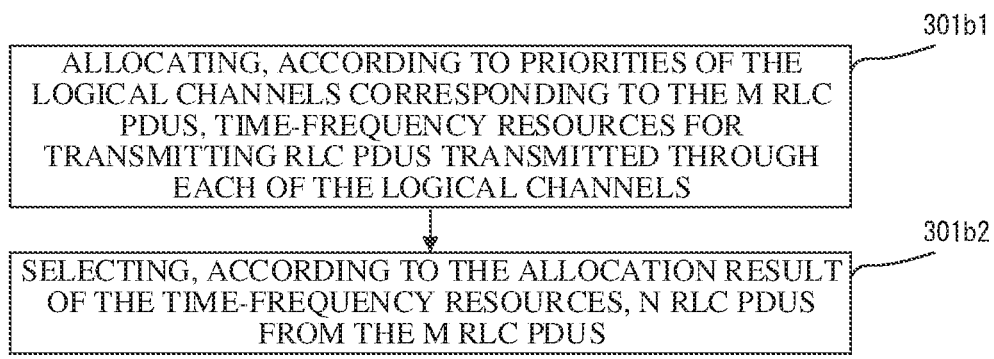
FIG. 3C is a flowchart of a data transmission method according to an exemplary embodiment.

In one example, as shown in FIG. 3C, step 301b includes the following sub-steps.

In step 301b1, time-frequency resources for transmitting RLC PDUs transmitted through respective logical channels are allocated according to priorities of the logical channels corresponding to the m RLC PDUs.

For a high priority logical channel, the MAC layer preferentially allocates time-frequency resources for the RLC PDUs transmitted through the high priority logical channel, so as to preferentially transmit the RLC PDUs received from the high priority logical channel to the lower layer.

For example, assuming that the priority of the first logical channel is higher than the priority of the second logical channel, the MAC layer preferentially allocates time-frequency resources for the first logical channel, so as to preferentially transmit the RLC PDUs received from the first logical channel to the lower layer. For example, the MAC layer allocates relatively more time-frequency resources for the first logical channel and relatively less time-frequency resources for the second logical channel.

In step 301b2, n RLC PDUs are selected from the m RLC PDUs according to the allocation result of the time-frequency resources.

The MAC layer selects n RLC PDUs from the in RLC PDUs according to the allocation result of the time-frequency resources. For example, assuming that the RLC layer transmits 5 RLC PDUs to the MAC layer through the first logical channel and 5 RLC PDUs to the MAC layer through the second logical channel. If the MAC layer allocates relatively more time-frequency resources for the first logical channel, the MAC layer may select 3 RLC PDUs from the 5 RLC PDUs transmitted through the first logical channel, select 2 RLC PDUs from the 5 RLC PDUs transmitted through the second logical channel, and then concatenate the 5 selected RLC PDUs to form one MAC PDU.

In one embodiment, the MAC layer allocates a corresponding maximum transport block size (TB-size) for each logical channel. The maximum transport block size corresponding to a logical channel indicates an upper limit of a total length of the RLC PDUs selected from the RLC PDUs transmitted through the logical channel.

For each logical channel, the MAC layer detects whether the total length of the RLC PDUs selected from the RLC PDUs transmitted through the logical channel is larger than the maximum transport block size corresponding to the logical channel. If the total length is larger than the maximum transport block size, the MAC layer splits the last RLC PDU selected from the RLC PDUs transmitted through the logical channel to obtain a first part and a second part, wherein the total length of the first part of the last RLC PDU and the other RLC PDUs selected from the RLC PDUs transmitted through the logical channel than the last RLC PDU is not larger than the maximum transport block size corresponding to the logical channel. If the total length of the RLC PDUs selected from the RLC PDUs transmitted through the logical channel is not larger than the maximum transport block size, the MAC layer does not need to perform the above splitting processing. For example, if the maximum transport block size allocated by the MAC layer for the first logical channel is 100 bits, and the length of each of the 3 RLC PDUs selected by the MAC layer from the RLC PDUs transmitted through the first logical channel is 40 bits, the MAC layer has to split the selected third RLC PDU, and for example, split it into two parts each having a length of 20 bits, so that the selected first RLC PDU, the second RLC PDU, and the first part of the selected third RLC have a total length not larger than 100 bits.

In step 302, the indication information corresponding to the n RLC PDUs is used as a header of the MAC PDU, and the n RLC PDUs are used as a body of the MAC PDU, and the header and the body are encapsulated into a MAC PDU, wherein the indication information corresponding to the n RLC PDUs includes a LCID, a sequence number, and a length corresponding to each of the RLC PDUs.

After selecting n RLC PDUs, the MAC layer concatenates the n RLC PDUs to form one MAC PDU. The MAC PDU includes a header and a body, wherein the header includes indication information corresponding to n RLC PDUs, and the body includes n RLC PDUs (i.e., data portions). In the embodiment of the present disclosure, the sequence number corresponding to each RLC PDU is encapsulated in the header of the MAC PDU, instead of in the body of the MAC PDU, thereby facilitating improving the efficiency of parsing and obtaining the sequence number corresponding to each RLC PDU after the communication peer receives the MAC PDU.

In one example, the header of the MAC PDU includes n sub-headers. The i-th sub-header includes: an LCID, a sequence number, and a length corresponding to the i-th RLC PDU, where the i is a positive integer less than or equal to n.

Figure 3D:
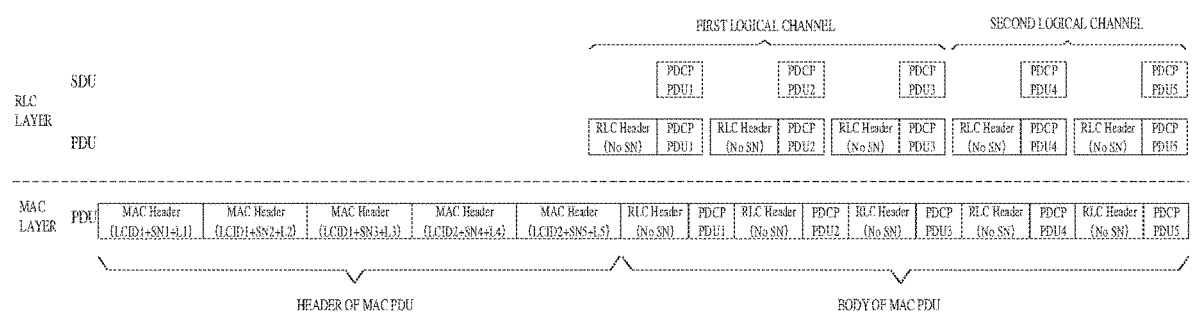
FIG. 3D is a schematic diagram of constructing a MAC PDU according to an exemplary embodiment.

Referring to FIG. 3D, as an example, the MAC layer concatenates 5 RLC PDUs received from the RLC layer. It is assumed that 3 of the RLC PDUs are transmitted through the first logical channel, and the other 2 of the RLC PDUs are transmitted through the second logical channel. For each RLC PDU, the MAC layer uses a sub-header to indicate the LCID, sequence number, and length of the RLC PDU. That is, each sub-header includes a logical channel identifier field, a sequence number field, and a length field. The logical channel identifier field indicates the LCID corresponding to the RLC PDU, the sequence number field indicates the sequence number corresponding to the RLC PDU, and the length field indicates the length corresponding to the RLC PDU. As shown in FIG. 3D, the header of the MAC PDU includes 5 sub-headers. The first sub-header includes the LCID, the sequence number, and the length corresponding to the first RLC PDU (illustrated as LCID1+SN1+L1), the second sub-header includes the LCID, the sequence number, and the length corresponding to the second RLC PDU (illustrated as LCID1+SN2+L2), and so on so forth. The fifth sub-header includes the LCID, the sequence number, and the length corresponding to the fifth RLC PDU ((illustrated as LCID3+SN5+L5). The order of the n sub-headers is consistent or matches with the order of the n RLC PDUs.

It should be noted that the position order of each field corresponding to the RLC PDU in the sub-header is not limited, and may be pre-defined by a protocol. In FIG. 3D, as an example for illustration, the position order of each field corresponding to the RLC PDU in the sub-header is sequentially the logical channel identifier field, the sequence number field, and the length field, but it is not intended to limit the present disclosure. For example, in other embodiments, the position order of each field corresponding to the RLC PDU in the sub-header may be sequentially a logical channel identifier field, a length field, and a sequence number field; or a sequence number field, a logical channel identifier field, and a length field, and so on.

In another example, the header of the MAC PDU includes k sub-headers, where k is the number of the logical channels corresponding to n RLC PDUs, and k is a positive integer. The j-th sub-header includes: an LCID of the j-th logical channel, sequence numbers and lengths corresponding to p RLC PDUs transmitted through the j-th logical channel among the n RLC PDUs, where j is a positive integer less than or equal to k, and p is a positive integer less than or equal to n. The order of then RLC PDUs, the order of the sequence numbers corresponding to the n RLC PDUs, and the order of the lengths of the n RLC PDUs are consistent.

In this example, for each logical, the MAC layer uses a sub-header to indicate a LCID of the logical channel and a sequence number and a length corresponding to each RLC PDU transmitted through the logical channel, respectively. Compared with the first example above, it is not necessary to indicate the corresponding LCID in the header of the MAC PDU for each RLC PDU, which can help to reduce the length of the header of the MAC PDU.

In the embodiment of the present disclosure, the following two implementation manners are provided.

First, the sequence numbers corresponding to the p RLC PDUs are consecutively and sequentially arranged, and the lengths corresponding to the p RLC PDUs are consecutively and sequentially arranged.

Figure 3E:
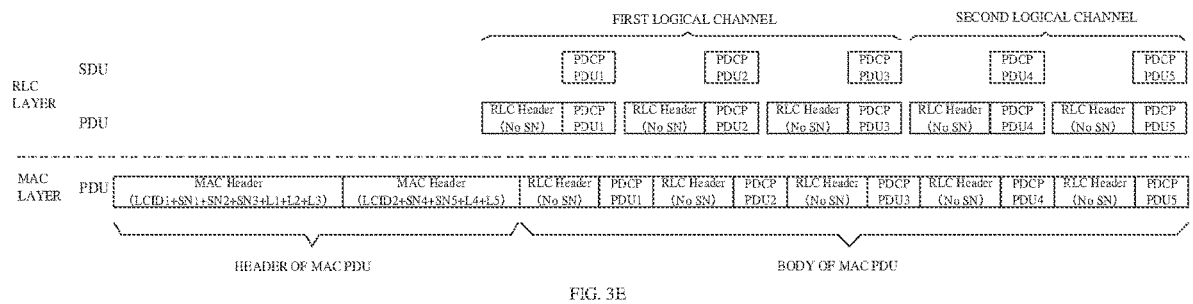
FIG. 3E is another schematic diagram of constructing a MAC PDU according to an exemplary embodiment.

Referring to FIG. 3E, as an example, the MAC layer concatenates 5 RLC PDUs received from the RLC layer. It is assumed that 3 of the RLC PDUs are transmitted through the first logical channel, and the other 2 of the RLC PDUs are transmitted through the second logical channel. The header of the MAC PDU includes 2 sub-headers. The first sub-header includes an LCID of the first logical channel, the sequence numbers and the lengths corresponding to the 3 RLC PDUs transmitted through the first logical channel. The second sub-header includes an LCID of the second logical channel, and the sequence numbers and the lengths corresponding to the 2 RLC PDUs transmitted through the second logical channel. In this implementation, the sequence numbers corresponding to the respective RLC PDUs transmitted through the same logical channel are consecutively and sequentially arranged, and the lengths corresponding to the respective RLC PDUs transmitted through the same logical channel are consecutively and sequentially arranged. For example, as shown in FIG. 3E, in the first sub-header, the order of the respective fields is: the LCID of the first logical channel (LCID1), the sequence number corresponding to the first RLC PDU (SN1), and the sequence number corresponding to the second RLC PDU (SN2), the sequence number corresponding to the third RLC PDU (SN3), the length corresponding to the first RLC PDU (L1), the length corresponding to the second RLC PDU (L2), and the length corresponding to the third RLC PDU (L3). In the second sub-header, the order of the respective fields is: the LCID of the second logical channel (LCID2), the sequence number corresponding to the first RLC PDU (SN4), the sequence number corresponding to the second RLC PDU (SN5), the length corresponding to the first RLC PDU (L4) and the length corresponding to the second RLC PDU (L5).

Second, the sequence numbers and lengths corresponding to the p RLC PDUs are arranged alternately one by one.

Figure 3F:
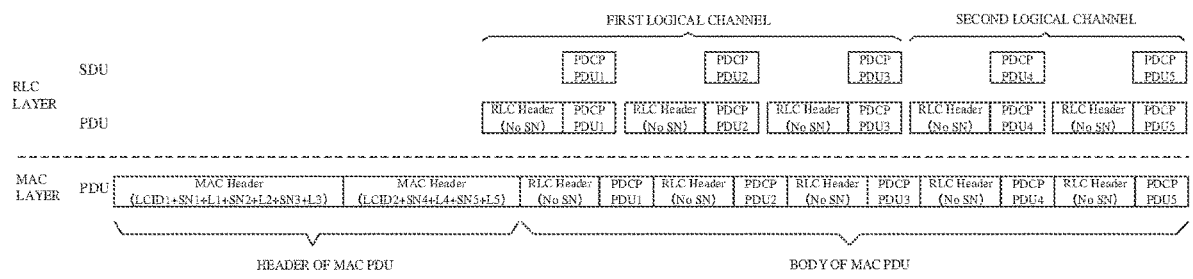
FIG. 3F is another schematic diagram of constructing a MAC PDU according to an exemplary embodiment.

Referring to FIG. 3F, as an example, the MAC layer concatenates 5 RLC PDUs received from the RLC layer. It is assumed that 3 of the RLC PDUs are transmitted through the first logical channel, and the other 2 of the RLC PDUs are transmitted through the second logical channel. The header of the MAC PDU includes 2 sub-headers. The first sub-header includes an LCID of the first logical channel, the sequence numbers and the lengths corresponding to the 3 RLC PDUs transmitted through the first logical channel. The second sub-header includes an LCID of the second logical channel, and the sequence numbers and the lengths corresponding to the 2 RLC PDUs transmitted through the second logical channel. In this implementation, the sequence numbers and lengths corresponding to the respective RLC PDUs transmitted through the same logical channel are arranged alternately one by one. For example, as shown in FIG. 3F, in the first sub-header, the order of the respective fields is: the LCID of the first logical channel (LCID1), the sequence number corresponding to the first. RLC PDU (SN1), and the first length corresponding to the RLC PDU (L1), the sequence number corresponding to the second RLC PDU (SN2), the length corresponding to the second RLC PDU (L2), the sequence number corresponding to the third RLC PDU (SN3), and the third length corresponding to third RLC PDU (L3). In the second sub-header, the order of the respective fields is: the LCID of the second logical channel (LCID2), the sequence number corresponding to the first RLC PDU (SN4), the length corresponding to the first RLC PDU (L4), the sequence number corresponding to the second RLC PDU (SN5) and the length corresponding to the second RLC PDU (L5).

It should be noted that the position order of the fields included in the sub-header is not limited, and may be predetermined by the protocol. The position orders of the fields shown in the above-mentioned FIG. 3E and FIG. 3F are merely exemplary and are not intended to limit the present disclosure. For example, in the above-mentioned first implementation, and in other embodiments, the position order of each field included in the sub-header may also be: a logical channel identifier field, a length field corresponding to each RLC PDU, and the sequence number field corresponding to each RLC PDU.

In addition, under a normal circumstance, the order of each RLC PDU in the body of the MAC PDU is determined according to the logical channel corresponding thereto, and the RLC PDUs received from the same logical channel are arranged adjacent to one another. When the MAC layer encapsulates the MAC PDU, if the number of logical channels corresponding to the n RLC PDUs is greater than 1, the RLC PDUs received from the same logical channel are concatenated adjacent to one another, and then the RLC PDUs received from another logical channel is concatenated.

In step 303, the MAC PDU is sent to a communication peer.

After generating a MAC PDU by concatenation, the MAC layer sends the MAC PDU to the communication peer. In one example, when the first device is a terminal, the terminal may send a MAC PDU to the base station through a wireless interface. In another example, when the first device is a base station, the base station may send the MAC PDU to the terminal through a wireless interface. For the process of parsing and processing the MAC PDU after the communication peer receives the MAC PDU, description may be referred embodiment shown in FIG. 4 below.

In the method provided by the present embodiment, the sequence number corresponding to each RLC PDU is encapsulated in the header of the MAC PDU when the MAC PDU is formed by the MAC layer concatenating the RLC PDUs. It can solve the problem in the related that the delay due to processing the MAC PDU by the communication peer is high, and it can improve the efficiency of parsing and obtaining the sequence number corresponding to each RLC PDU after the communication peer receives the MAC PDU.

In addition, this embodiment provides two exemplary approaches for constructing a MAC PDU. When the MAC layer uses a sub-header for each logical channel, to indicate the LCID of the logical channel and the sequence number and length corresponding to each RLC PDU transmitted through the logical channel, it is not necessary to indicate the corresponding LCID in the header of the MAC PDU for each RLC PDU, which can help to reduce the length of the header of the MAC PDU.

Figure 4:
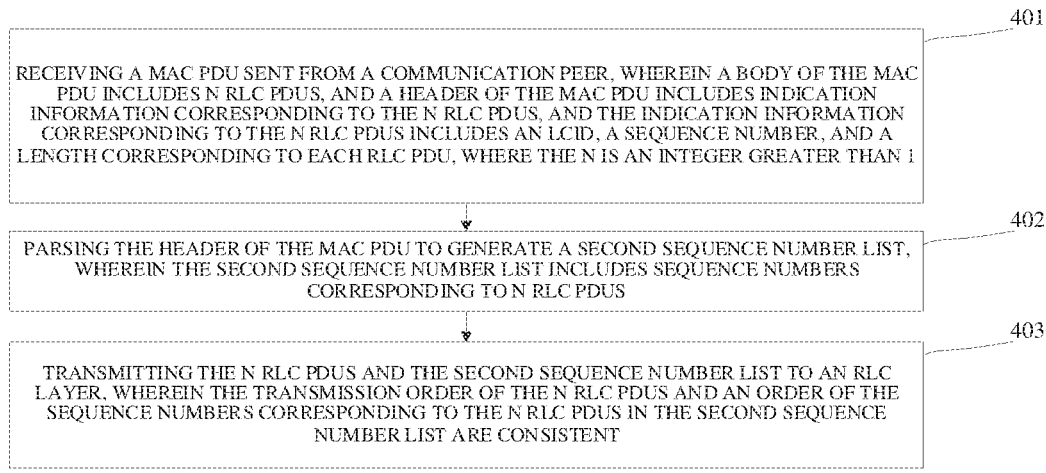
FIG. 4 is a flowchart of a data transmission method according to another exemplary embodiment.

FIG. 4 is a flowchart of a data transmission method according to another exemplary embodiment. In this embodiment, the method is applied to the second device as an example. For example, the second device may be a terminal or a base station. The method can include the following steps.

In step 401, the MAC PDU sent from the communication peer is received. The body of the MAC PDU includes n RLC PDUs, and the header of the MAC PDU includes indication information corresponding to the n RLC PDUs. The indication information corresponding to the n RLC PDUs includes the LCID, the sequence number, and the length corresponding to each RLC PDU, and the n is an integer greater than 1.

The MAC layer receives the MAC PDU sent from the communication peer. For the structure of the packet of the MAC PDU, reference may be made to the description in the embodiment shown in FIG. 3A, which will not be repeated in this embodiment. In the embodiment of the present disclosure, the logical channel identifier, the sequence number, and the length of each RLC PDU are encapsulated in the header of the MAC PDU, instead of in the body of the MAC PDU, thereby it can help to improve the efficiency of parsing and obtaining the indication information corresponding to each RLC PDU after the communication peer receives the MAC PDU.

In step 402, the header of the MAC PDU is parsed to generate a second sequence number list, where the second sequence number list includes sequence numbers corresponding to n RLC PDUs.

The MAC layer parses the header of the MAC PDU to generate a second sequence number list. The MAC layer sequentially reads the sequence number corresponding to the RLC PDU from each sub-header, and then generates a second sequence number list. The order of the n sequence numbers included in the second sequence number list is identical to the order in which they are arranged in each sub-header. Taking the MAC PDU shown in FIGS. 3D, 3E, and 3F as an example, the second sequence number list generated by parsing the header of the MAC PDU includes five sequence numbers, and the order of the sequence numbers is: SN1, SN2, SN3, SN4, and SN5.

In step 403, the n RLC PDUs and the second sequence number list are transmitted to the RLC layer, wherein the transmission order of the n RLC PDUs and an order of the sequence numbers corresponding to the n RLC PDUs in the second sequence number list are consistent.

The MAC layer transmits the n RLC PDUs and the second sequence number list to the RLC layer. The MAC layer sequentially transmits the RLC PDUs one by one to the RLC layer, according to the order of the sequence numbers corresponding to the RLC PDUs in the second sequence number list.

In addition, in the embodiment of the present disclosure, the timing at which the MAC layer sends the second sequence number list to the RLC layer is not limited. The MAC layer may send the second sequence number s n the process of transmitting the RLC PDUs to the RLC layer, may send the second sequence number list before transmitting the RLC PDUs to the RLC layer, or may send the second sequence number list after transmitting the RLC PDUs to the RLC layer.

In the method provided by the present embodiment, the sequence number corresponding to each RLC PDU is encapsulated in the header of the MAC PDU. It can solve the problem in the related that the delay due to processing the received MAC PDU by the receiving device is high, and it can improve the efficiency of parsing and obtaining the sequence number corresponding to each RLC PDU after the receiving device receives the MAC PDU.

The following is a device embodiment of the present disclosure, which may be used to implement the method embodiments of the present disclosure. For details of the device embodiments, please refer to the method embodiments of the present disclosure.

Figure 5:
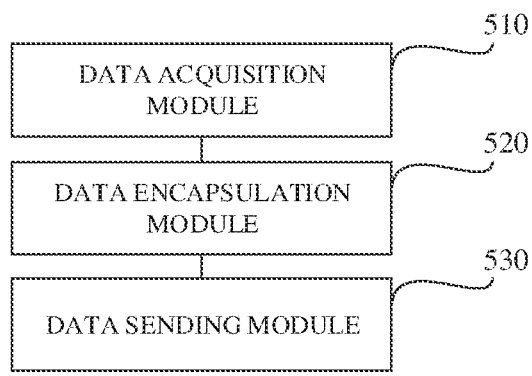
FIG. 5 is a block diagram of a data transmission device according to an exemplary embodiment.

FIG. 5 is a block diagram of a data transmission device according to an exemplary embodiment. The device has the function of implementing the data transmission method on the first device side, and the function may be implemented by hardware or by executing corresponding software by hardware. The device may include: a data acquisition module 510, a data encapsulation module 520, and a data sending module 530.

The data acquisition module 510 is configured to acquire PDUs transmitted from an RLC layer, where n is an integer greater than 1.

The data encapsulation module 520 is configured to use indication information corresponding to the n RLC PDUs as a header of a MAC PDU, and use the n RLC PDUs as a body of the MAC PDU, and encapsulate the header and the body to generate the MAC PDU. The indication information corresponding to the n RLC PDUs includes an LCID, a sequence number, and a length corresponding to each of the RLC PDUs.

The data sending module 530 is configured to send the MAC PDU to the communication peer.

In the device provided in this embodiment, the sequence number corresponding to each RLC PDU is encapsulated in the header of the MAC PDU when the MAC PDU is formed by the MAC layer concatenating the RLC PDUs. It can solve the problem in the related that the delay due to processing the MAC PDU by the communication peer is high, and it can improve the efficiency of parsing and obtaining the sequence number corresponding to each RLC PDU after the communication peer receives the MAC PDU.

In an embodiment, the header of the MAC PDU includes n sub-headers.

The i-th sub-header includes: an LCID, a sequence number, and a length corresponding to the i-th RLC PDU, re the i is a positive integer less than or equal to the n.

In another embodiment, the header of the MAC PDU includes k sub-headers, where k is the number of logical channels corresponding to e n RLC PDUs, and k is a positive integer.

The j-th sub-header includes: an LCID of the j-th logical channel, sequence numbers and lengths corresponding to p RLC PDUs transmitted through the j-th logical channel among the n RLC PDUs, where the j is a positive integer less than or equal to the k, and the p is a positive integer less than or equal to the n.

The order of the n RLC PDUs, the order of the sequence numbers corresponding to the n RLC PDUs, and the order of the lengths corresponding to the n RLC PDUs are consistent.

In an embodiment, the sequence numbers corresponding to the p RLC PDUs are consecutively and sequentially arranged, and the lengths of the p RLC PDUs are consecutively and sequentially arranged or the sequence numbers and lengths corresponding to the p RLC PDUs are arranged alternately one by one.

Figure 6:
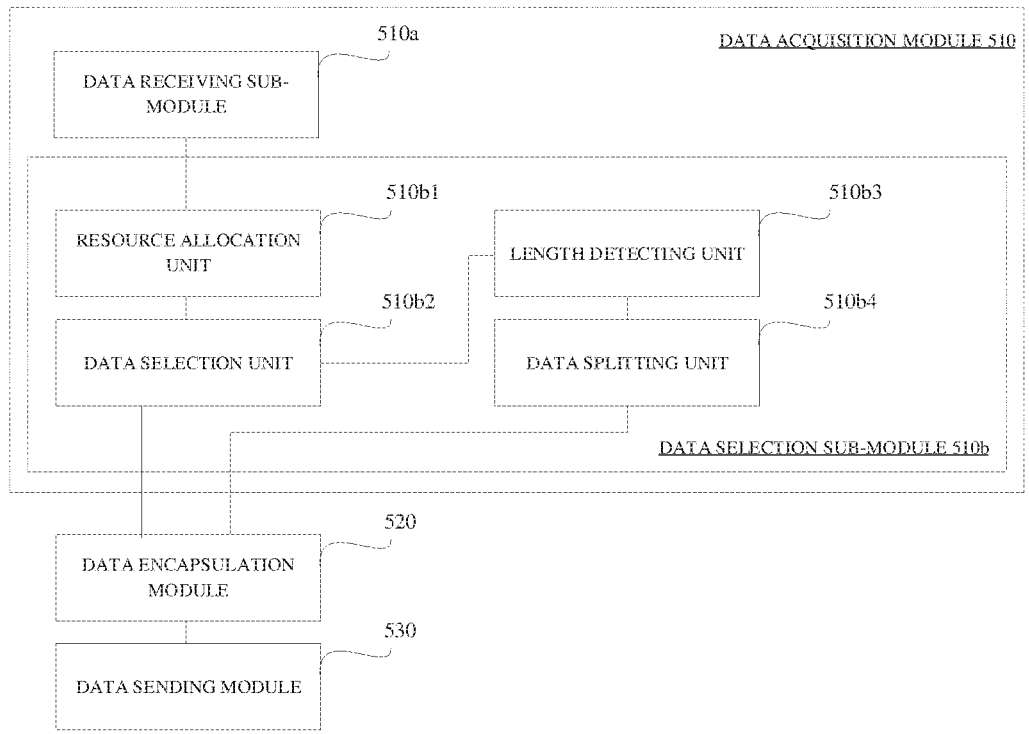
FIG. 6 is a block diagram of a data transmission device according to another exemplary embodiment.

In another embodiment, shown in FIG. 6, the data acquisition module 510 includes: a data receiving sub-module 510a and a data selection sub-module 510b.

The data receiving sub-module 510a is configured to receive the m RLC PDUs and a first sequence number list transmitted from the RLC layer, wherein the first sequence number list includes sequence numbers corresponding to the in RLC PDUs, and an order of the sequence numbers corresponding to the in RLC PDUs is consistent with the transmission order of the m RLC PDUs, where the m is an integer greater than 1.

The data selection sub-module 510b is configured to select the n RLC PDUs from the in RLC PDUs.

In an embodiment, shown in FIG. 6, the data selection sub-module 510b includes: a resource allocation unit 510b1 and a data selection unit 510b2.

The resource allocation unit 510b1 is configured to allocate, according to priorities of the logical channels corresponding to the m RLC PDUs, time-frequency resources for transmitting the RLC PDUs transmitted through each of the logical channels.

The data selection unit 510b2 is configured to select, according to the allocation result of the time-frequency resources, the n RLC PDUs from the in RLC PDUs.

In an embodiment, shown in FIG. 6, the data selection sub-module 510b further includes: a length detecting unit 510b3 and a data splitting unit 510b4.

The length detecting unit 510b3 is configured to detect, for each logical channel, whether a total length of RLC PDUs selected from. RLC PDUs transmitted through the logical channel is greater than a maximum transport block size corresponding to the logical channel. The maximum transport block size corresponding to the logical channel indicates an upper limit of the total length of the RLC PDUs selected from the RLC PDUs transmitted through the logical channel.

The data splitting unit 510b4 is configured to, when the total length of RLC PDUs selected from RLC PDUs transmitted through the logical channel is greater than the maximum transport block size corresponding to the logical channel, split the last RLC PDU selected from the RLC PDUs transmitted through the logical channel into a first part and a second part.

A sum of a length of the first part of the last RLC PDU and a total length of the other RLC PDUs selected from the RLC PDUs transmitted through the logical channel than the last RLC PDU is not larger than the maximum transport block size corresponding to the logical channel.

Figure 7:
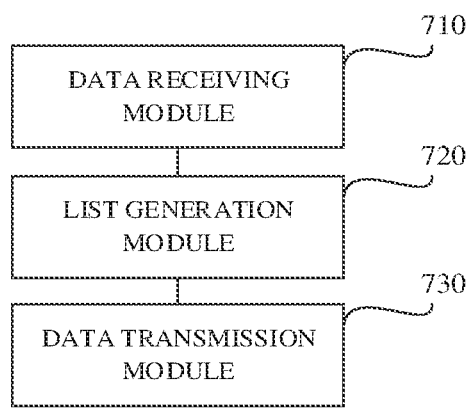
FIG. 7 is a block diagram of a data transmission device according to another exemplary embodiment.

FIG. 7 is a block diagram of a data transmission device according to another exemplary embodiment. The device has a function of implementing the data transmission method on the second device side, and the function may be implemented by hardware or by executing corresponding software by hardware. The device may include a data receiving module 710, a list generation module 720, and a data transmission module 730.

The data receiving module 710 is configured to receive a MAC PDU sent from a communication peer, wherein a body of the MAC PDU includes n RLC PDUs, a header of the MAC PDU includes indication information corresponding to the n RLC PDUs. The indication information corresponding to the n RLC PDUs includes an LCID, a sequence number, and a length corresponding to each of the RLC PDUs, where n is an integer greater than 1.

The list generation module 720 is configured to parse the header of the MAC PDU to generate a second sequence number list, wherein the second sequence number list includes sequence numbers corresponding to the n RLC PDUs.

The data transmission module 730 is configured to transmit the n RLC PDUs and the second sequence number list to the RLC layer, wherein the transmission order of the n RLC PDUs and an order of the sequence numbers corresponding to the n RLC PDUs in the second sequence number list are consistent.

In the device provided in this embodiment, the sequence number corresponding to each RLC PDU is encapsulated in the header of the MAC PDU when the MAC PDU is formed by the MAC layer concatenating the RLC PDUs. It can solve the problem be related that the delay due to processing the received MAC PDU by the receiving device is high, and it can improve the efficiency of parsing and obtaining the sequence number corresponding to each RLC PDU after the receiving device receives the MAC PDU.

In an embodiment, the header of the MAC PDU includes n sub-headers.

The i-th sub-header includes: an LCID, a sequence number, and a length corresponding to the i-th RLC PDU, the i is a positive integer less than or equal to the wherein n.

In another embodiment, the header of the MAC PDU includes k sub-headers, where the k is the number of logical channels corresponding to the n RLC PDUs, and the k is a positive integer.

The j-th sub-header includes: an LCID of the j-th logical channel, sequence numbers and lengths corresponding top RLC PDUs transmitted through the j-th logical channel among the n RLC PDUs, wherein the j is a positive integer less than or equal to the k, the p is a positive integer less than or equal to the n.

The order of the n RLC PDUs, the order of the sequence numbers corresponding to the n RLC PDUs, and the order of the lengths corresponding to the n RLC PDUs are consistent.

In an embodiment, the sequence numbers corresponding to the p RLC PDUs are consecutively and sequentially arranged, and the lengths corresponding to the p RLC PDUs are consecutively and sequentially arranged; or the sequence numbers and lengths corresponding to the p RLC PDUs are arranged alternately one by one.

Embodiments of the present disclosure also provide a data transmission system (or communication system), and the system includes: a first device and a second device.

The first device includes a data transmission device similar to that illustrated in FIGS. 5 and 6. The second device includes a data transmission device similar to that illustrated in FIG. 7.

It should be noted that, when the device provided by the foregoing embodiment implements its function, only the division of each functional module described above is illustrated. In actual applications, the function may be completed by different functional modules according to actual needs. The device may be divided into different functional modules to complete all or part of the functions described above.

With regard to the device in the above embodiments, the specific manner in which the respective modules perform the operations has been described in detail in the embodiment relating to the method, and will not be repeated in detail herein.

Embodiments of the present disclosure further provide a data transmission device capable of implementing a data transmission method on a first device side provided by the present disclosure. The device includes a processor and a memory for storing executable instructions of the processor. The processor is configured to: acquire n RLC PDUs transmitted from a radio link control RLC layer, where the n is an integer greater than 1; use indication information corresponding to the n RLC PDUs as a header of a medium access control MAC PDU, and use the n RLC PDUs as a body of the MAC PDU, and encapsulate them to generate the MAC PDU, wherein the indication information corresponding to the n RLC PDUs includes a LCID, a sequence number, and a length corresponding to each of the RLC PDUs; and send the MAC PDU to a communication peer.

For the structure of the packet of the MAC PDU, reference may be made to the description in the embodiment shown FIG. 3A, which is not repeated in this embodiment.

In an embodiment, the processor is configured to: receive the in RLC PDUs and a first sequence number list transmitted from the RLC layer, wherein the first sequence number list includes the sequence numbers corresponding to the in RLC PDUs, and an order of the sequence numbers corresponding to the m RLC PDUs is consistent with the transmission order of the m RLC PDUs, where the m is an integer greater than 1; and select the n RLC PDUs from the m RLC PDUs.

In an embodiment, the processor is configured to: allocate, according to priorities of the logical channels corresponding to the m RLC PDUs, time-frequency resources for smitting the RLC PDUs transmitted through each of the logical channels; and select, according to the allocation result of the time-frequency resources, the n RLC PDUs from the m RLC PDUs.

In an embodiment, the processor is further configured to: detect, for each logical channel, whether a total length of RLC PDUs selected from RLC PDUs transmitted through the logical channel is greater than a maximum transport block size corresponding to the logical channel, wherein the maximum transport block size corresponding to the logical channel indicates an upper limit of a total length of the RLC PDUs selected from the RLC PDUs transmitted through the logical channel; and when the total length of RLC PDUs selected from RLC PDUs transmitted through the logical channel is greater than the maximum transport block size corresponding to the logical channel, split the last RLC PDU selected from the RLC PDUs transmitted through the logical channel into a first part and a second part, wherein a sum of a length of the first part of the last RLC PDU and a total length of the other RLC PDUs selected from e RLC PDUs transmitted through the logical channel than the last RLC PDU is not larger than the maximum transport block size corresponding to the logical channel.

Embodiments of the present disclosure further provide a data transmission device capable of implementing a data transmission method on a second device side provided by the present disclosure. The device includes a processor and a memory for storing executable instructions of the processor. The processor is configured to: receive a medium access control MAC protocol data unit PDU sent from a communication peer, wherein a body of the MAC PDU includes n radio link control RLC PDUs, a header of the MAC PDU includes indication information corresponding to the n RLC PDUs, and the indication information corresponding to the n RLC PDUs includes a logical channel identifier LCID, a sequence number, and a length corresponding to each of the RLC PDUs, where the n is an integer greater than 1; parse the header of the MAC PDU to generate a second sequence number list, wherein the second sequence number list includes sequence numbers corresponding to the n RLC PDUs; and transmit the n RLC PDUs and the second sequence number list to an RLC layer, wherein the transmission order of the n RLC PDUs and an order of the sequence numbers corresponding to then RLC PDUs in the second sequence number list are consistent.

For the structure of the packet of the MAC PDU, reference may be made to the description in the embodiment shown in FIG. 3A, which is not repeated in this embodiment.

The foregoing provides a scheme for the embodiments of the present disclosure by taking a base station and a terminal as an example. It can be understood that, in order to implement the above functions, the base station and the terminal include hardware and/or software corresponding to each function. The embodiments of the present disclosure can be implemented in hardware, or software, or a combination of hardware and software. Whether a function is implemented in hardware or software depends on the specific application and design constraints of the solution. A person skilled in the art can use different methods to implement the described functions for each specific application, but such implementation should not be considered to be beyond the scope of the technical solutions of the embodiments of the present disclosure.

Figure 8:
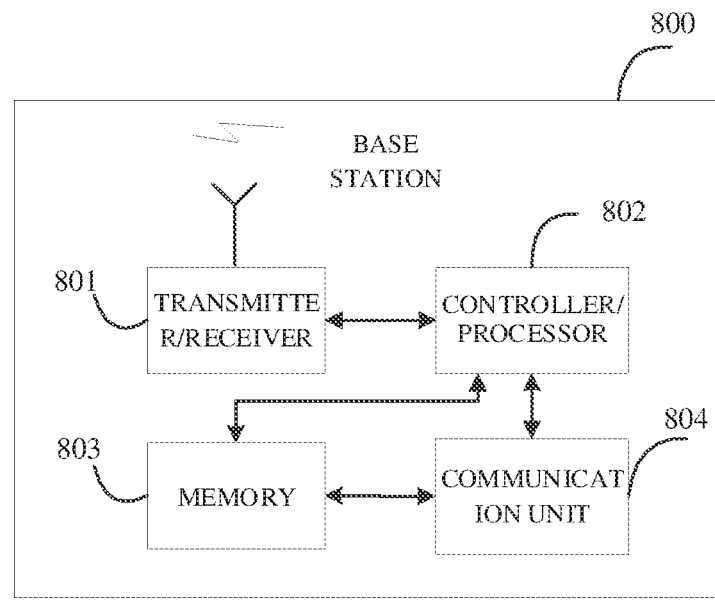
FIG. 8 is a schematic diagram of a base station according to an exemplary embodiment.

FIG. 8 is a schematic diagram of a base station 800 according to an exemplary embodiment.

The base station 800 includes a transmitter/receiver 801 and a processor 802. The processor 802 can also be a controller, and is represented as "controller/processor 802" in FIG. 8. The transmitter/receiver 801 is configured to support transmission and reception of information between the base station and the terminal in the above embodiment, and to support radio communication between the terminal and other terminals. The processor 802 performs various functions for communicating with a terminal. On the uplink, an uplink signal front the terminal is received via an antenna, demodulated by the receiver 801 (e.g., demodulated into a baseband signal from a high frequency signal), and further processed by the processor 802 to recover the service data and signaling information sent by the terminal. On the downlink, service data and signaling messages are processed by the processor 802 and modulated by the transmitter 801 (e.g., modulating a baseband signal into a high frequency signal) to produce a downlink signal that is transmitted to the terminal via an antenna. It should be noted that the above demodulation or modulation function may also be completed by the processor 802. For example, the processor 802 is further configured to perform various steps in the foregoing method embodiments, and/or other steps of the technical solutions described in the embodiments of the present disclosure.

The base station 800 may further include a memory 803 for storing program codes and data of the base station 800 and a communication unit 804. The communication unit 804 is configured to support the base station to communicate with other network entities (s as network devices in the core network, etc.). For example, in the LTE system, the communication unit 804 may be an S1-U interface for supporting communication between the base station and a Serving Gateway (S-GW); or the communication unit 804 may also be an S1-MME interface for supporting communication between the base station and a Mobility Management Entity (MME).

It will be appreciated that FIG. 8 shows only a simplified design of the base station 800. In a practical application, the base station 800 can include any number of transmitters, receivers, processors, controllers, memories, communication units, etc., and all base stations that can implement the embodiments of the present disclosure fall within the protection scope of the embodiments of the present disclosure.

Figure 9:
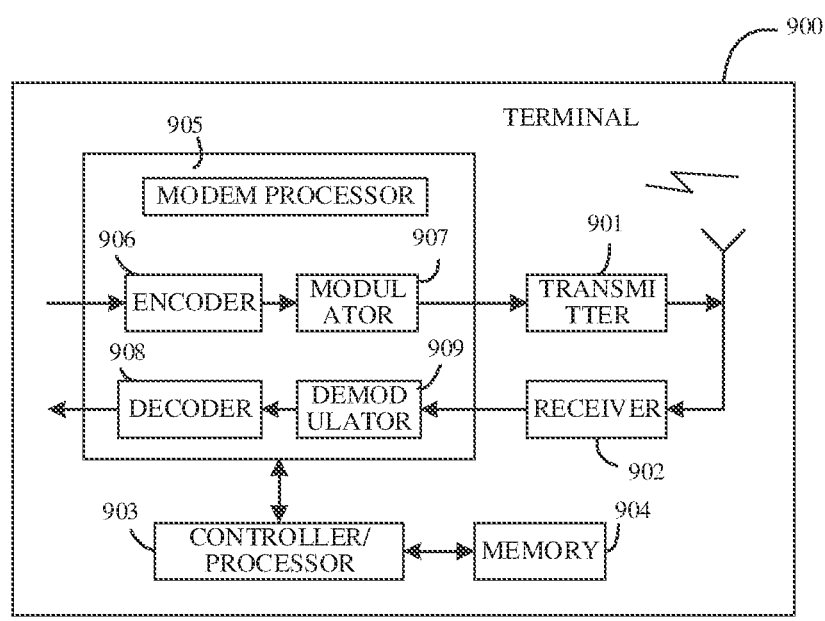
FIG. 9 is a schematic diagram of a terminal according to an exemplary embodiment.

FIG. 9 is a schematic diagram of a terminal 900 according to an exemplary embodiment.

The terminal 900 includes a transmitter 901, a receiver 902, and a processor 903. The processor 903 may also be a controller, and is represented as "controller/processor 903" in FIG. 9. The terminal 900 may further include a modem processor 905, wherein the modem processor 905 may include an encoder 906, a modulator 907, a decoder 908, and a demodulator 909.

In an embodiment, the transmitter 901 adjusts (e.g., analog transforms, filters, amplifies, upconverts, etc.) output samples and generates an uplink signal that is transmitted via an antenna to the base station described in the above embodiments. On the downlink, the antenna receives the downlink signal transmitted by the base station in the above embodiment. The receiver 902 adjusts (e.g., filters, amplifies, downconverts, digitizes, etc.) the signals received from the antenna and provides input samples. In a modem processor 905, the encoder 906 receives the service data and signaling messages to be transmitted on the uplink, and processes (e.g., formats, codes, and interleaves) the service data and signaling messages. The modulator 907 further processes (e.g., symbol maps and modulates) the encoded service data and signaling messages and provides output samples. The demodulator 909 processes (e.g., demodulates) the input samples and provides symbol estimates. The decoder 908 processes (e.g., deinterleaves and decodes) the symbol estimates and provides decoded data and signaling messages that are sent to the terminal 900. The data may be processed according to the radio access technology employed by the radio access network (e.g., access technologies of LTE and other evolved systems). It should be noted that when the terminal 900 does not include the modem processor 905, the above functions of the modem processor 905 can also be completed by the processor 903.

The processor 903 performs control management on the actions of the terminal 900. For example, the processor 903 is also configured to perform various steps in the above method embodiments, and/or other steps of the technical solutions described in the embodiments of the present disclosure.

Further, the terminal 900 may further include a memory 904 for storing program codes and data for the terminal 900.

The processor for performing the functions of the foregoing base station or terminal in the embodiment of the present disclosure may be a central processing unit (CPU), a general-purpose processor, a digital signal processor (DSP), and an application specific integrated circuit (ASIC), a Field Programmable Gate Array (FPGA) or other programmable logic device, transistor logic device, hardware component, or any combination thereof. It may implement or perform various exemplary logical blocks, modules and circuits described in connection with the embodiments of the present disclosure. The processor may also be a combination of computing functions, for example, including one or more microprocessor combinations, a combination of a DSP and a microprocessor, and the like.

The steps of the method or algorithm described in connection with the disclosure of the embodiments of the present disclosure may be implemented in a hardware manner, or may be implemented by a processor executing software instructions. The software instructions may be composed of corresponding software modules, which may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read only (CD-ROM) or any other form of storage medium known in the art. An exemplary storage medium is coupled to the processor to enable the processor to read information from, and write information to, the storage medium. The storage medium can also be an integral part of the processor. The processor and the storage medium can be located in an ASIC. Additionally, the ASIC can be located in a base station or a terminal. The processor and the storage medium may also reside as discrete components in a base station or a terminal.

Those skilled in the art will appreciate that in one or lore examples described above, functions described in the embodiments of the present disclosure can be implemented in hardware, software, firmware, or any combination thereof. When implemented in software, the functions may be stored in a computer readable medium or transmitted as one or more instructions or code on a computer readable medium. Computer readable media includes both computer storage media and communication media including any medium that facilitates transfer of a computer program from one location to another. A storage medium may be any available media that can be accessed by a general purpose or special purpose computer.

Embodiments of the present disclosure also provide a computer storage medium for storing computer software instructions for use in the base station or the terminal, including a program designed to execute the data transmission method described above.

It should be understood that "multiple" as referred to herein means two or more. The term "and/or", describing the association relationship of the associated objects, indicates that there may be three relationships, for example, A and/or B, which may indicate that there are three cases where A exists separately, A and B exist at the same time, and B exists separately. The character "/" generally indicates that the contextual object is an "or" relationship.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A data transmission method, comprising:
  acquiring n radio link control (RLC) protocol data units (PDUs) transmitted from an RLC layer, wherein the n is an integer greater than 1;
  using indication information corresponding to the n RLC PDUs as a header of a medium access control (MAC) PDU, and using the n RLC PDUs as a body of the MAC PDU, and encapsulating the header and the body to generate the MAC PDU, wherein the indication information corresponding to the n RLC PDUs comprises a logical channel identifier (LCID), a sequence number, and a length corresponding to each of the RLC PDUs; and
  sending the MAC PDU to a communication peer,
  wherein the acquiring the n RLC PDUs transmitted from the RLC layer comprises:
    receiving m RLC PDUs and a first sequence number list transmitted from the RLC layer, wherein the first sequence number list comprises sequence numbers corresponding to the m RLC PDUs, and an order of the sequence numbers corresponding to the m RLC PDUs and a transmission order of the m RLC PDUs are consistent, wherein the m is an integer greater than 1;
    allocating, according to priorities of logical channels corresponding to the m RLC PDUs, time-frequency resources for transmitting the RLC PDUs transmitted through each of the logical channels;
    selecting, according to an allocation result of the time-frequency resources, the n RLC PDUs from the m RLC PDUs;
    detecting, for each logical channel, whether a total length of RLC PDUs selected from RLC PDUs transmitted through the logical channel is greater than a maximum transport block size corresponding to the logical channel, wherein the maximum transport block size corresponding to the logical channel indicates an upper limit of a total length of the RLC PDUs selected from the RLC PDUs transmitted through the logical channel; and
    when the total length of RLC PDUs selected from RLC PDUs transmitted through the logical channel is greater than the maximum transport block size corresponding to the logical channel, splitting a last RLC PDU selected from the RLC PDUs transmitted through the logical channel into a first part and a second part, wherein a sum of a length of the first part of the last RLC PDU and a total length of the other RLC PDUs selected from the RLC PDUs transmitted through the logical channel than the last RLC PDU is not larger than the maximum transport block size corresponding to the logical channel.

2. The method according to claim 1, wherein the header of the MAC PDU comprises n sub-headers; and
  an i-th sub-header comprises: an LCID, a sequence number, and a length corresponding to the i-th RLC PDU, wherein the i is a positive integer less than or equal to the n.

3. The method according to claim 1, wherein the header of the MAC PDU comprises k sub-headers, the k is a number of logical channels corresponding to the n RLC PDUs, and the k is a positive integer; and a j-th sub-header comprises: an LCID of the j-th logical channel, sequence numbers and lengths corresponding to p RLC PDUs transmitted through the j-th logical channel among the n RLC PDUs, wherein the j is a positive integer less than or equal to the k, and the p is a positive integer less than or equal to the n; and an order of the n RLC PDUs, an order of the sequence numbers corresponding to the n RLC PDUs, and an order of the lengths corresponding to the n RLC PDUs are consistent.

4. The method according to claim 3, wherein the sequence numbers corresponding to the p RLC PDUs are consecutively and sequentially arranged, and the lengths corresponding to the p RLC PDUs are consecutively and sequentially arranged; or the sequence numbers and the lengths corresponding to the p RLC PDUs are arranged alternately one by one.

5. A data transmission method, comprising:

receiving a medium access control (MAC) protocol data unit (PDU) sent from a communication peer, wherein a body of the MAC PDU comprises n radio link control (RLC) PDUs, a header of the MAC PDU comprises indication information corresponding to the n RLC PDUs, and the indication information corresponding to the n RLC PDUs comprises a logical channel identifier (LCID), a sequence number, and a length corresponding to each of the RLC PDUs, wherein the n is an integer greater than 1;

parsing the header of the MAC PDU to generate a second sequence number list, wherein the second sequence number list comprises sequence numbers corresponding to the n RLC PDUs; and transmitting the n RLC PDUs and the second sequence number list to an RLC layer, wherein a transmission order of the n RLC PDUs and an order of the sequence numbers corresponding to the n RLC PDUs in the second sequence number list are consistent, wherein the MAC PDU is generated by the communication peer, comprising:

receiving m RLC PDUs and a first sequence number list transmitted from an RLC layer of the communication peer, wherein the first sequence number list comprises sequence numbers corresponding to the m RLC PDUs, and an order of the sequence numbers corresponding to the m RLC PDUs and a transmission order of the m RLC PDUs are consistent, wherein the m is an integer greater than 1;

allocating, according to priorities of logical channels corresponding to the m RLC PDUs, time-frequency resources for transmitting the RLC PDUs transmitted through each of the logical channels;

selecting, according to an allocation result of the time-frequency resources, the n RLC PDUs from the m RLC PDUs;

detecting, for each logical channel, whether a total length of RLC PDUs selected from RLC PDUs transmitted through the logical channel is greater than a maximum transport block size corresponding to the logical channel, wherein the maximum transport block size corresponding to the logical channel indicates an upper limit of a total length of the RLC PDUs selected from the RLC PDUs transmitted through the logical channel; and when the total length of RLC PDUs selected from RLC PDUs transmitted through the logical channel is greater than the maximum transport block size corresponding to the logical channel, splitting a last RLC PDU selected from the RLC PDUs transmitted through the logical channel into a first part and a second part, wherein a sum of a length of the first part of the last RLC PDU and a total length of the other RLC PDUs selected from the RLC PDUs transmitted through the logical channel than the last RLC PDU is not larger than the maximum transport block size corresponding to the logical channel.

6. The method according to claim 5, wherein the header of the MAC PDU comprises n sub-headers; and an i-th sub-header comprises: an LCID, a sequence number, and a length corresponding to the i-th RLC PDU, wherein the i is a positive integer less than or equal to the n.

7. The method according to claim 5, wherein the header of the MAC PDU comprises k sub-headers, the k is a number of logical channels corresponding to the n RLC PDUs, and the k is a positive integer;

a j-th sub-header comprises: an LCID of the j-th logical channel, sequence numbers and lengths corresponding to p RLC PDUs transmitted through the j-th logical channel among the n RLC PDUs, wherein the j is a positive integer less than or equal to the k, the p is a positive integer less than or equal to the n; and an order of the n RLC PDUs, an order of the sequence numbers corresponding to the n RLC PDUs, and an order of the lengths corresponding to the n RLC PDUs are consistent.

8. The method according to claim 7, wherein the sequence numbers corresponding to the p RLC PDUs are consecutively and sequentially arranged, and the lengths of the p RLC PDUs are consecutively and sequentially arranged; or the sequence numbers and the lengths corresponding to the p RLC PDUs are arranged alternately one by one.

9. A data transmission device, comprising:

a processor; and a memory for storing instructions executable by the processor, wherein the processor is configured to:

acquire n radio link control (RLC) protocol data units (PDUs) transmitted from an RLC layer, wherein the n is an integer greater than 1;

use indication information corresponding to the n RLC PDUs as a header of a medium access control (MAC) PDU, and use the n RLC PDUs as a body of the MAC PDU, and encapsulate the header and the body to generate the MAC PDU, wherein the indication information corresponding to the n RLC PDUs comprises a logical channel identifier (LCID), a sequence number, and a length corresponding to each of the RLC PDUs; and send the MAC PDU to a communication peer, wherein in acquiring the n RLC PDUs transmitted from the RLC layer, the processor is further configured to:

receive m RLC PDUs and a first sequence number list transmitted from the RLC layer, wherein the first sequence number list comprises sequence numbers corresponding to the m RLC PDUs, and an order of the sequence numbers corresponding to the m RLC PDUs and a transmission order of the m RLC PDUs are consistent, wherein the m is an integer greater than 1;

allocate, according to priorities of logical channels corresponding to the m RLC PDUs, time-frequency resources for transmitting the RLC PDUs transmitted through each of the logical channels;

select, according to an allocation result of the time-frequency resources, the n RLC PDUs from the m RLC PDUs;

detect, for each logical channel, whether a total length of RLC PDUs selected from RLC PDUs transmitted through the logical channel is greater than a maximum transport block size corresponding to the logical channel, wherein the maximum transport block size corresponding to the logical channel indicates an upper limit of a total length of the RLC PDUs selected from the RLC PDUs transmitted through the logical channel; and when the total length of RLC PDUs selected from RLC PDUs transmitted through the logical channel is greater than the maximum transport block size corresponding to the logical channel, split a last RLC PDU selected from the RLC PDUs transmitted through the logical channel into a first part and a second part, wherein a sum of a length of the first part of the last RLC PDU and a total length of the other RLC PDUs selected from the RLC PDUs transmitted through the logical channel than the last RLC PDU is not larger than the maximum transport block size corresponding to the logical channel.

10. The device according to claim 9, wherein the header of the MAC PDU comprises n sub-headers; and
an i-th sub-header comprises: an LCID, a sequence number, and a length corresponding to the i-th RLC PDU, wherein the i is a positive integer less than or equal to the n.

11. The device according to claim 9, wherein the header of the MAC PDU comprises k sub-headers, wherein the k is a number of logical channels corresponding to the n RLC PDUs, and the k is a positive integer; and
a j-th sub-header comprises: an LCID of the j-th logical channel, sequence numbers and lengths corresponding to p RLC PDUs transmitted through the j-th logical channel among the n RLC PDUs, wherein the j is a positive integer less than or equal to the k, and the p is a positive integer less than or equal to the n; and
an order of the n RLC PDUs, an order of the sequence numbers corresponding to the n RLC PDUs, and an order of the lengths corresponding to the n RLC PDUs are consistent.

12. The device according to claim 11, wherein
the sequence numbers corresponding to the p RLC PDUs are consecutively and sequentially arranged, and the lengths of the p RLC PDUs are consecutively and sequentially arranged; or
the sequence numbers and the lengths corresponding to the p RLC PDUs are arranged alternately one by one.

13. A data transmission device, comprising:
a processor; and
a memory for storing instructions executable by the processor,
wherein the processor is configured to:
receive a medium access control (MAC) protocol data unit (PDU) sent from a communication peer, wherein a body of the MAC PDU comprises n radio link control (RLC) PDUs, a header of the MAC PDU comprises indication information corresponding to the n RLC PDUs, and the indication information corresponding to the n RLC PDUs comprises a logical channel identifier (LCID), a sequence number, and a length corresponding to each of the RLC PDUs, wherein the n is an integer greater than 1;

parse the header of the MAC PDU to generate a second sequence number list, wherein the second sequence number list comprises sequence numbers corresponding to the n RLC PDUs; and
transmit the n RLC PDUs and the second sequence number list to an RLC layer, wherein a transmission order of the n RLC PDUs and an order of the sequence numbers corresponding to the n RLC PDUs in the second sequence number list are consistent,
wherein the MAC PDU is generated by the communication peer, comprising:
receiving m RLC PDUs and a first sequence number list transmitted from an RLC layer of the communication peer, wherein the first sequence number list comprises sequence numbers corresponding to the m RLC PDUs, and an order of the sequence numbers corresponding to the m RLC PDUs and a transmission order of the m RLC PDUs are consistent, wherein the m is an integer greater than 1;
allocating, according to priorities of logical channels corresponding to the m RLC PDUs, time-frequency resources for transmitting the RLC PDUs transmitted through each of the logical channels;
selecting, according to an allocation result of the time-frequency resources, the n RLC PDUs from the m RLC PDUs;
detecting, for each logical channel, whether a total length of RLC PDUs selected from RLC PDUs transmitted through the logical channel is greater than a maximum transport block size corresponding to the logical channel, wherein the maximum transport block size corresponding to the logical channel indicates an upper limit of a total length of the RLC PDUs selected from the RLC PDUs transmitted through the logical channel; and
when the total length of RLC PDUs selected from RLC PDUs transmitted through the logical channel is greater than the maximum transport block size corresponding to the logical channel, splitting a last RLC PDU selected from the RLC PDUs transmitted through the logical channel into a first part and a second part, wherein a sum of a length of the first part of the last RLC PDU and a total length of the other RLC PDUs selected from the RLC PDUs transmitted through the logical channel than the last RLC PDU is not larger than the maximum transport block size corresponding to the logical channel.

14. The device according to claim 13, wherein the header of the MAC PDU comprises n sub-headers; and
an i-th sub-header comprises: an LCID, a sequence number, and a length corresponding to the i-th RLC PDU, wherein the i is a positive integer less than or equal to the n.

15. The device according to claim 13, wherein the header of the MAC PDU comprises k sub-headers, the k is a number of logical channels corresponding to the n RLC PDUs, and the k is a positive integer;
a j-th sub-header comprises: an LCID of the j-th logical channel, sequence numbers and lengths corresponding to p RLC PDUs transmitted through the j-th logical channel among the n RLC PDUs, wherein the j is a positive integer less than or equal to the k, the p is a positive integer less than or equal to the n; and
an order of the n RLC PDUs, an order of the sequence numbers corresponding to the n RLC PDUs, and an order of the lengths corresponding to the n RLC PDUs are consistent.

16. The device according to claim 15, wherein
the sequence numbers corresponding to the p RLC PDUs are consecutively and sequentially arranged, and the lengths corresponding to the p RLC PDUs are consecutively and sequentially arranged; or
the sequence numbers and the lengths corresponding to the p RLC PDUs are arranged alternately one by one.

* * * * *